United States Patent [19]
Chaug et al.

[11] Patent Number: 5,930,086
[45] Date of Patent: Jul. 27, 1999

[54] HEAT EXCHANGEABLE THIN-FILM RECORDING HEAD ELEMENT AND METHOD FOR MANUFACTURING SAME

[75] Inventors: Yi-Shung Chaug; Subrata Dey, both of Boulder, Colo.

[73] Assignee: Storage Technology Corporation, Louisville, Colo.

[21] Appl. No.: 08/850,039

[22] Filed: May 2, 1997

[51] Int. Cl.⁶ .................................................. G11B 5/127
[52] U.S. Cl. ............................................................ 360/113
[58] Field of Search .................................... 360/113, 119, 360/121, 122, 126; 324/207.21

[56] References Cited

U.S. PATENT DOCUMENTS

| | | | |
|---|---|---|---|
| 5,331,493 | 7/1994 | Schwarz | 360/113 |
| 5,644,455 | 7/1997 | Schultz | 360/113 |
| 5,652,687 | 7/1997 | Chen et al. | 360/126 |

*Primary Examiner*—Brian E. Miller
*Attorney, Agent, or Firm*—Brooks & Kushman P.C.

[57] ABSTRACT

A recording element is provided for use in a high density thin film recording head. The recording element includes a substrate, a thermally conductive material in contact with the substrate, and an insulative layer in contact with the thermally conductive material. The recording element further includes a magneto-resistive element in contact with the insulative layer such that the magneto-resistive element fails to overlay the thermally conductive material. The thermally conductive material and the insulative layer have thermal conductivities sufficient to dissipate heat from the magneto-resistive element so that heat induced malfunctions of the recording element are minimized. The method for manufacturing the recording element is also provided. The method includes depositing a thermally conductive material in contact with a substrate, depositing an insulative layer in contact with the thermally conductive material, and depositing a magneto-resistive element in contact with the insulative layer such that the magneto-resistive element fails to overlay the thermally conductive material.

13 Claims, 6 Drawing Sheets

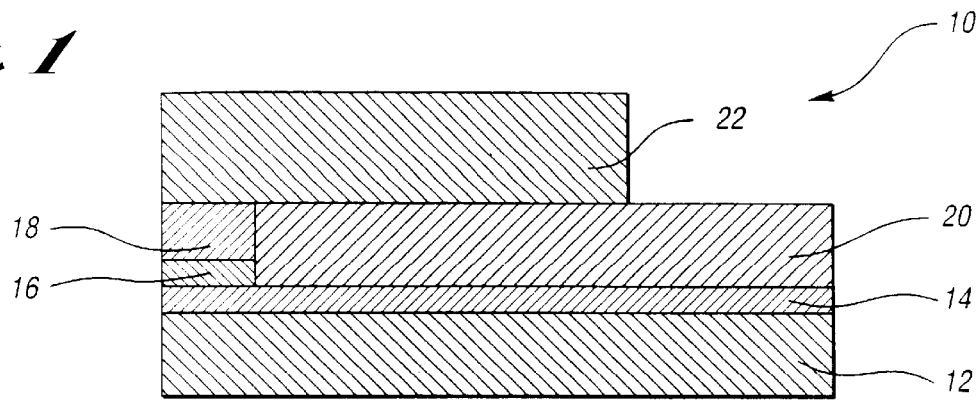
Fig. 1
| | I | II | III |
|---|---|---|---|
| THROAT HEIGHT (MICRONS) | 15 | 5 | 4 |
| MR FILM THICKNESS (Å) | 800 | 400 | 250 |
| OPERATION CURRENT (mA) | 20 | 10 (MRI & MR2) | 10 (MRI & MR2) |
| CURRENT DENSITY [j] (×10$^6$ A/cm$^2$) | 1.67 | 5.0 | 10.0 |
| CURRENT DENSITY RATIO | 1 | 3 | 6 |
| JOULE HEAT DENSITY [j2p] RATIO | 1 | 9 | 36 |
Fig. 2
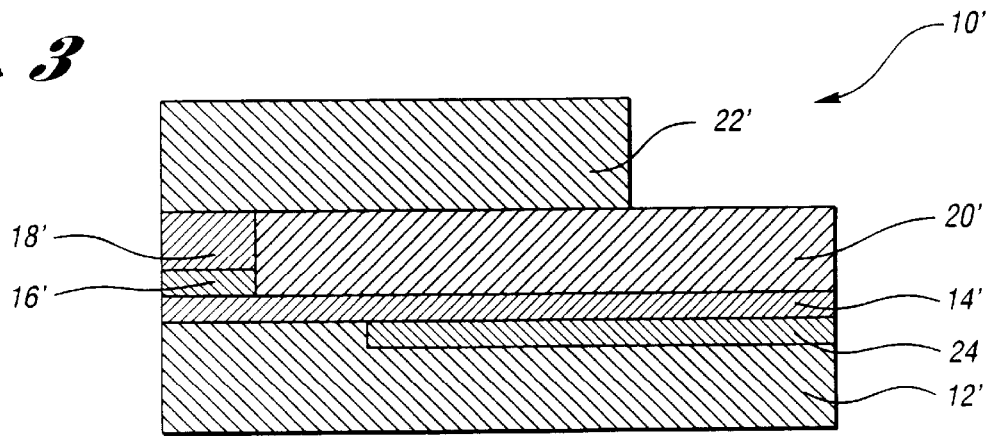
Fig. 3

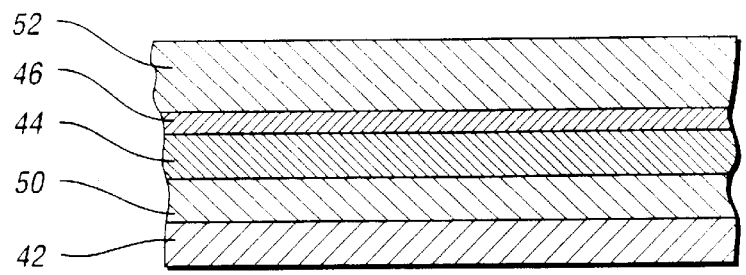
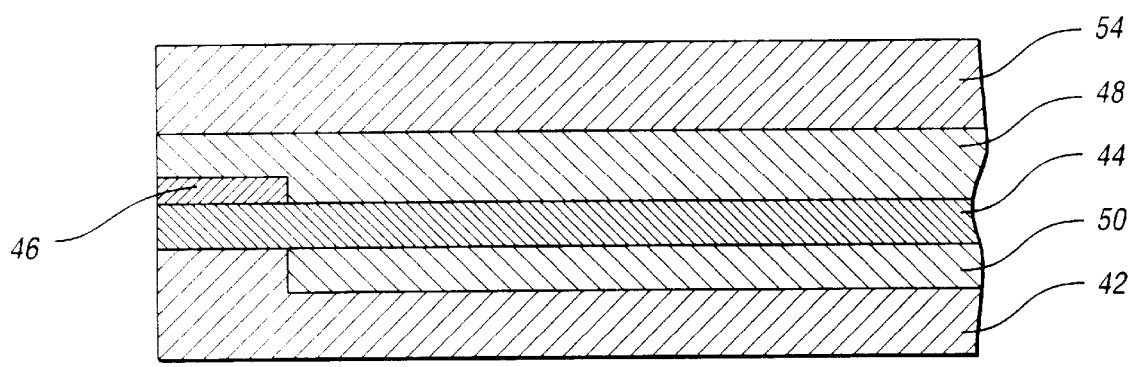
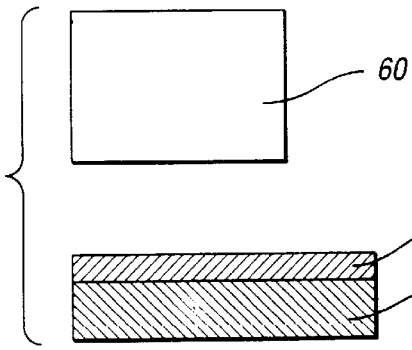
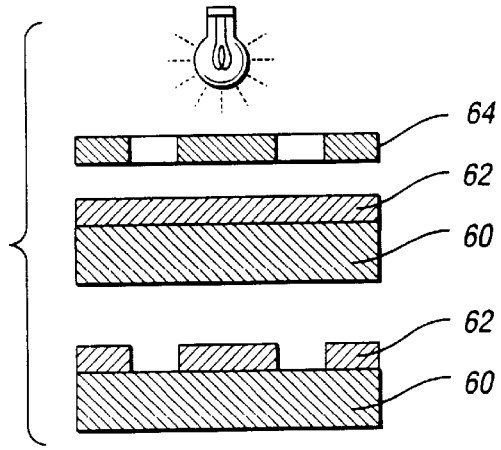

HEAT EXCHANGEABLE THIN-FILM RECORDING HEAD ELEMENT AND METHOD FOR MANUFACTURING SAME

TECHNICAL FIELD

The present invention relates to a heat exchangeable thin film recording element for use in a high density recording head, and a method for manufacturing that element.

BACKGROUND ART

The demand for increased data storage capacity in tape transport systems is driving efforts to decrease the track pitch and the track width in magnetic tapes, and to increase the track density in recording tape heads. For magneto-resistive (MR) and giant magneto-resistive (GMR) thin-film recording heads, increasing track density is generally accomplished by decreasing MR (or GMR) film thickness and the throat height in the recording sensor.

In current thin-film recording head design, the MR (or GMR) film in the recording sensor is sandwiched between insulating layers of aluminum oxide. As recording head element densities are increased, a great amount of heat is generated in the recording sensor during head operation. Because of the relatively poor thermal conductivity of aluminum oxide, such increased heat levels can produce temperature-activated malfunctions on the head including permeability deviation of the magnetic films, thermal-induced stress between films, thermal diffusion at film interface, electro-migration in the magnetic films, and others.

These thermal effects on the head will eventually deteriorate both head performance and head life. As a result, there exists a need for a heat exchange structure in the recording sensor to minimize such heat induced malfunctions. Such a heat exchange structure would allow for thin film manufacture of the recording element and hence the recording head.

SUMMARY OF THE INVENTION

Accordingly, a principal object of the present invention is to provide a heat exchangeable thin film recording head element for use in high density recording heads.

Another principal object of the present invention is to provide a method for manufacturing a heat exchangeable thin film recording head element for use in high density recording heads.

According to the present invention, then, a recording element for use in a high density thin film recording head is provided. The recording element comprises a substrate, a thermally conductive material in contact with the substrate, and an insulative layer in contact with the thermally conductive material. The recording element further comprises a magneto-resistive element in contact with the insulative layer such that the magneto-resistive element fails to overlay the thermally conductive material. The thermally conductive material and the insulative layer have thermal conductivities sufficient to dissipate heat from the magneto-resistive element so that heat induced malfunctions of the recording element are minimized.

A method for manufacturing a recording element for use in a high density thin film recording head is also provided according to the present invention. The method comprises depositing a thermally conductive material in contact with a substrate, depositing an insulative layer in contact with the thermally conductive material, and depositing a magneto-resistive element in contact with the insulative layer such that the magneto-resistive element fails to overlay the thermally conductive material. The thermally conductive material and the insulative layer have thermal conductivities sufficient to dissipate heat from the magneto-resistive element so that heat induced malfunctions of the recording element are minimized.

These and other objects, features and advantages will be readily apparent upon consideration of the following detailed description in conjunction with the accompanying drawings.

BRIEF DESCRIPTION OF THE DRAWINGS

FIG. 1 is a cross-sectional view of an exemplary prior art recording head element;

FIG. 2 is a table depicting various specifications for exemplary recording head element designs;

FIG. 3 is a cross-sectional view of an unshielded embodiment of the heat exchangeable thin film recording head element of the present invention;

FIGS. 5a–d depict an overall side view and various cross-sectional views of the heat exchangeable thin film recording element of the present invention.

DETAILED DESCRIPTION OF THE INVENTION

Figure 4:
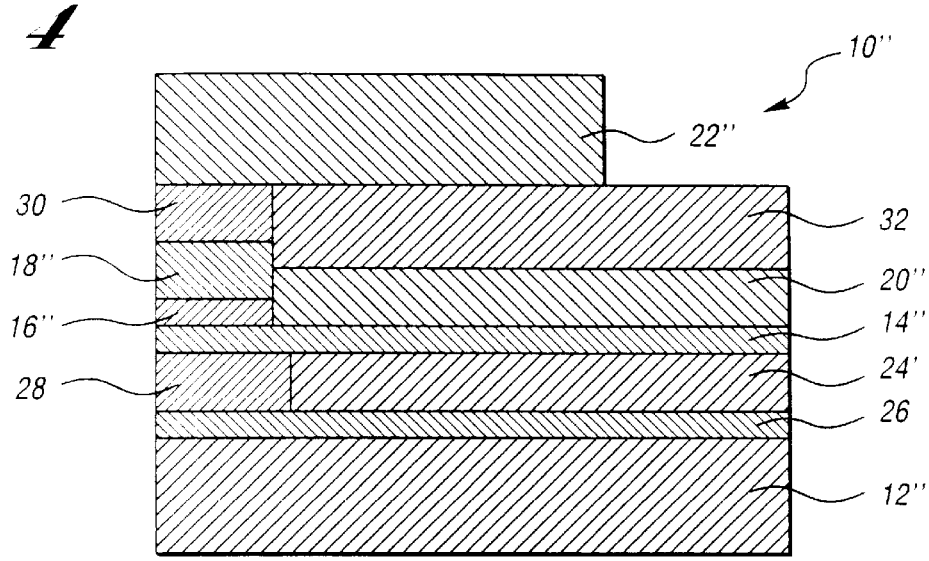
FIG. 4 is a cross-sectional view of a shielded embodiment of the heat exchangeable thin film recording head element of the present invention.

Referring now to FIGS. 1–6, the preferred embodiment of the present invention will now be described. In that regard, FIG. 1 shows a cross-sectional view of an exemplary prior art recording head element, denoted generally by reference numeral 10. As seen therein, such an element may include a substrate (12), which may be ferrite, having an insulative layer (14) deposited thereon. Insulative layer (14) is typically aluminum oxide, and may be deposited in any conventional fashion.

Next, a magneto-resistive (MR) or giant magneto-resistive (GMR) layer (16) may be deposited on insulative layer (14) using any known technique. As is well know to those of ordinary skill in the art, MR layer (16) is typically a permalloy and is provided to sense magnetic transitions on a tape, such that recording head element (10) acts as a read element. In that regard, MR layer (16) is processed in a known manner such that only a small portion remains at one end of substrate (12). Upon completion of the recording head element (10), this small portion of MR layer (16) acts as the read sensor.

Thereafter, another insulative layer (18), and a gold track layer (20) are fabricated using well known deposition and processing techniques. Once again, insulative layer (18) is typically aluminum oxide and, like insulative layer (14), serves to isolate MR layer (16). Gold track layer (20) is provided in contact with MR layer (16) and acts as a conductor to provide current to MR layer (16) for the purposes of sensing magnetic transitions on a tape. Finally, a closure material (22) is provided to complete and support recording head element (10).

As previously discussed, demand for greater data capacity on tapes is driving an effort to increase the density of elements on recording heads. For read head elements, greater density may be accomplished by decreasing throat height and the thickness of the MR layer. However, as recording head element densities increase, more heat is generated in the recording sensor during head operation.

More specifically, referring now to FIG. 2, a table is provided showing various specifications for exemplary recording head designs. As seen therein, a lower density read head element (I) has a throat height of 15 microns, a MR film thickness of 800 Angstroms, and an operating current of 20 milli-Amps. As a result, the element has a current density of 1.67 Amps per square centimeter. This lower density read head element (I) also has current density and Joule heat density ratios of one each. The resulting temperature rise in this type of read head element during operation is approximately 15 degrees.

For higher density read head elements (II) and (III), however, throat heights may be reduced to 5 and 4 microns, respectively, and MR film thicknesses may be reduced to 400 and 250 Angstroms, respectively. In these designs, two MR elements may be used for offset purposes, and each may have an operating current of 10 milli-Amps. Element current densities of 5 and 10 Amps per square centimeter therefore result. Moreover, current density ratios increase to 3 and 6, respectively, while Joule heat density ratios increase to 9 and 36, respectively. The resultant heat generated in these designs is the summation of the heat generated in each of the MR elements. For these estimates, it should be noted that it is assumed that the resistivity of the MR layer is not changed by film thickness.

As also previously discussed, because of the relatively poor thermal conductivity of the aluminum oxide insulative layers surrounding the MR layer in the read element, such increased heat levels can produce noise as well as temperature-activated malfunctions on the head including permeability deviation of the magnetic films, thermal-induced stress between films, thermal diffusion at film interface, electro-migration in the magnetic films, and other malfunctions as heat is accumulated, rather than dissipated, by the aluminum oxide material of insulative layer (14). These thermal effects eventually deteriorate both head performance and head life.

Referring now to FIG. 3, an embodiment of the heat exchangeable thin film recording element of the present invention is shown in cross-section, denoted generally by reference numeral 10'. As seen therein, recording element (10') is similar to recording element (10) of FIG. 1, but is provided with a heat exchange structure to dissipate the increased heat generated by use of the element in a high density recording head architecture.

More specifically, like recording head element (10) of FIG. 1, recording head element (10') may include a substrate (12'), insulative layer (14'), MR layer (16'), insulative layer (18'), gold track layer (20'), and closure material (22'). Significantly, however, recording element (10') also includes a thermally conductive layer (24) provided between substrate (12') and insulative layer (14').

Thermally conductive layer (24) is preferably diamond-like carbon, although other materials such as graphite-like carbon may be used. The important characteristic of thermally conductive layer (24) is that it have relatively high thermal conductivity. Moreover, in this embodiment, the aluminum oxide material typically used for insulative layer (14') is replaced with an insulating material having a higher thermal conductivity, preferably aluminum nitride.

In that regard, the thermal conductivities for diamond-like carbon and aluminum nitride are approximately 3–5 W/cm-s-°K and 2–3 W/cm-s-°K, respectively. In contrast, the thermal conductivity of aluminum oxide used in prior art recording head elements is approximately 0.5 W/cm-s-°K. The deposited carbon film can be characterized by spectroscopy of the infrared vibrations of CH1, CH2 and CH3 groups. Deconvolution of the spectra indicates width bands at wavenumbers from sp3-CH2 at 2850 and 2920 cm$^{-1}$, sp3-CH at 2920 cm.$^{-1}$, sp2-CH at 3000 cm$^{-1}$, sp2-CH at 3060 cm$^{-1}$, and sp1-CH at 3300 cm$^{-1}$. The sp3/sp2 ratio is interpreted as the transformation from diamond-like carbon film (DLC) to graphite-like carbon film. Diamond-like carbon film has a high sp3/sp2 ratio, less hydrogen content (less than 30%), high hardness and better thermal conductivity. That is, if the thermal conductivity for DLC is approximately 5 W/cm-s-°K, then the thermal conductivity for graphite-like carbon is approximately 3.75 W/cm-s-°K. These film characterizations are varied by the deposition techniques and the process parameters chosen.

Thus, the approach of the present invention is to replace aluminum oxide with aluminum nitride as the first gap layer deposited on top of diamond-like carbon film. Together, the first gap layer of aluminum nitride and the carbon film underneath act as a heat sink in the thin-film recording head. That is, a heat exchange structure is provided whereby Joule heat generated in the recording sensor is thermally conducted to the aluminum nitride and carbon film, thereby minimizing heat induced malfunctions in the high density recording head of which the recording sensor is a part.

Referring now to FIGS. 1 and 3, it should be noted that the relatively high hardness of diamond-like carbon, especially as compared to the hardness of the permalloy used in MR layer (16) of recording element (10), prevents diamond-like carbon from simply being used as a replacement for the aluminum oxide material of insulative layer (14). That is, with a diamond-like carbon insulative layer (24), over time, MR layer (16) would show greater wear from contact with a magnetic tape at the element-tape interface than insulative layer (14). To prevent this problem, the aluminum oxide material of insulative layer (14) is replaced with aluminum nitride (14'), which provides relatively high thermal conductivity for dissipating heat from MR layer (16'), without the hardness of diamond-like carbon. When an aluminum nitride insulative layer (14') is used in conjunction with a thermally conductive layer (24) of diamond-like carbon that does not underlay MR layer (16'), thermal conductivity and heat exchange are further enhanced.

It should also be noted that the embodiment of the heat exchangeable thin film recording element of the present invention shown in FIG. 3 is an unshielded element. Moreover, fabrication of the aluminum nitride insulative layer (14') may be accomplished using plasma-enhanced chemical vapor deposition. The selective deposition of diamond-like carbon layer (24) on substrate (12') can be achieved by photo-lithographical patterning, trenching, chemical vapor deposition, reactive ion etching, or other known techniques. The optimum thickness of the carbon film is determined by the amount of Joule heat generated in the recording sensor, and the thermal conductivities of the deposited aluminum nitride film and the carbon film.

Referring next to FIG. 4, a cross-sectional view of an alternative embodiment of the heat exchangeable thin film recording element of the present invention is shown, denoted generally by reference numeral (10"). As will be appreciated by those of ordinary skill in the art, the embodiment of the thin film recording element of FIG. 4 is a shielded element. More specifically, like recording element (10') of FIG. 3, recording element (10") includes a substrate (12"), insulative layer (14"), MR layer (16"), insulative layer (18"), gold track layer (20"), closure material (22"), and thermally conductive layer (24'). In that regard, insulative layer (14") is again preferably aluminum nitride, and thermally conductive layer (24') is again preferably diamond-like carbon.

However, because the heat exchangeable thin film recording element (10") is shielded, substrate (12") is a non-ferrite material and an insulative underlayer (26), preferably aluminum oxide, is deposited thereon. Moreover, bottom and top poles (28, 30), preferably permalloy, iron nitride or compounds, or cobalt alloy or compounds, are provided on opposite sides of respective insulative layers (14", 18"). Finally, an insulative overcoat (32), again preferably aluminum oxide, is also provided.

Figure 5A:
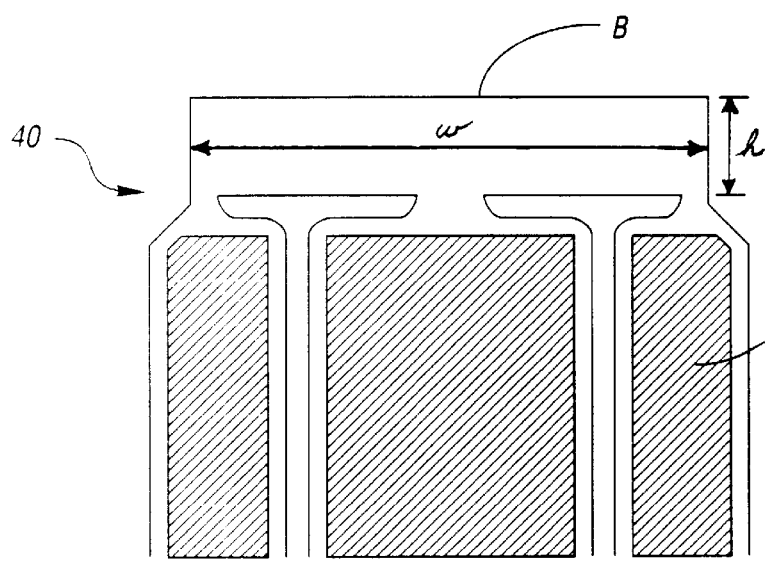

FIGS. 5a–d depict an overall side view and various cross-sectional views of a heat exchangeable thin film recording element of the present invention. Specifically, FIG. 5a shows an overall side view of the heat exchangeable thin film recording element, denoted generally by reference numeral 40, having a track width and throat height as shown. In that regard, conventional track widths of 400 microns for 18 track recording heads have been reduced to 150 microns for high density 36 track recording heads, and may be reduced even further to as little as 20 microns. Moreover, as discussed above in conjunction with FIG. 2, throat heights and MR layer thicknesses are also significantly reduced in high density recording head architectures.

Figure 5B:
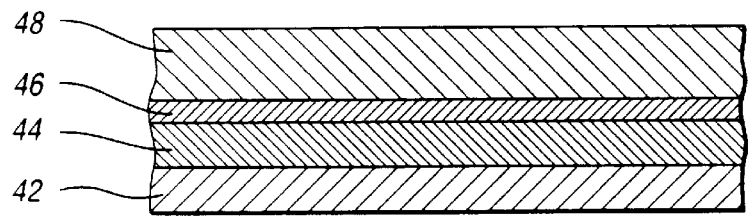

In operation, a magnetic tape passes across recording element (40) at point B. The cross-sectional view of recording element (40) at point B is shown in FIG. 5b. Similarly, the cross-sectional view of recording element (40) at point C is shown in FIG. 5c. FIG. 5d depicts an overall cross-sectional view of recording element (40).

As seen in FIG. 5b, at point B, the element-tape interface, the cross-section of recording element (40) includes a ferrite layer (42), an insulative aluminum nitride layer (44), MR sensor layer (46), and an insulative aluminum oxide layer (48). As seen in FIG. 5c, at point C, further back from the element-tape interface, the cross-section of recording element (40) includes ferrite layer (42), a diamond-like carbon thermally conductive layer (50), aluminum nitride insulative layer (44), MR sensor layer (46), and a gold track layer (52). Overall, as seen in FIG. 5d, the cross-section of recording element (40) includes ferrite layer (42), diamond-like carbon thermally conductive layer (50), aluminum nitride insulative layer (44), MR sensor layer (46), aluminum oxide layer (48), and another ferrite layer (54).

Figure 6C:
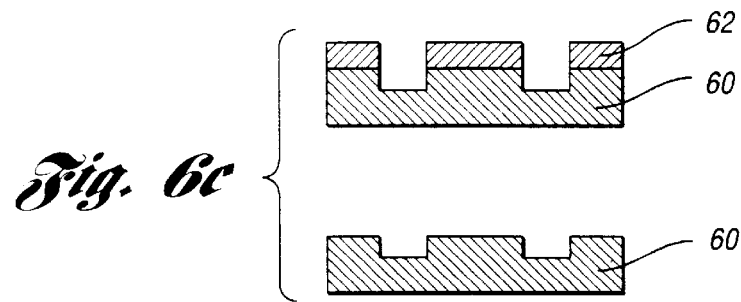
FIGS. 6a–p are a flow chart showing cross-sectional views of the heat exchangeable thin film recording element during manufacture according to the method of the present invention.
Figure 6D:
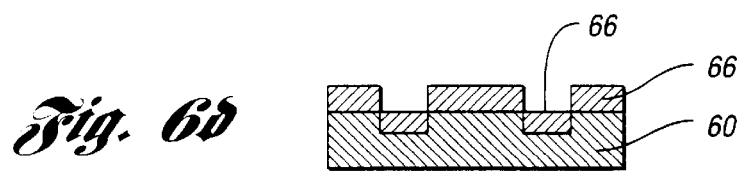
Figure 6E:
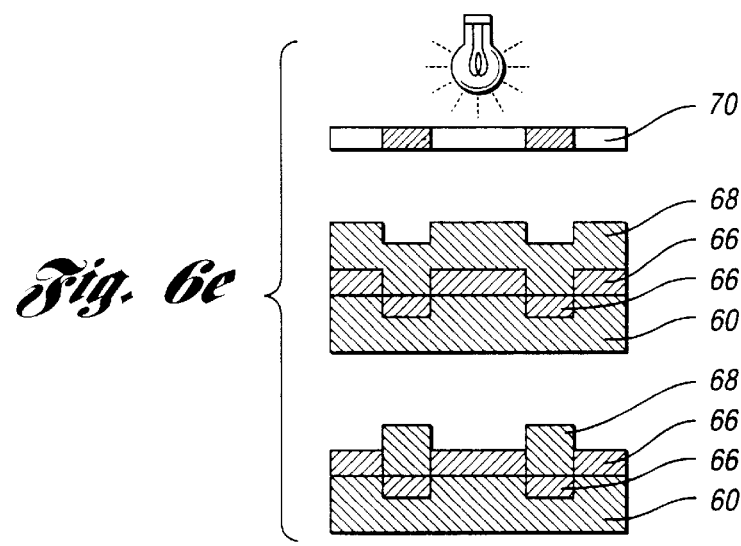
Figure 6F:
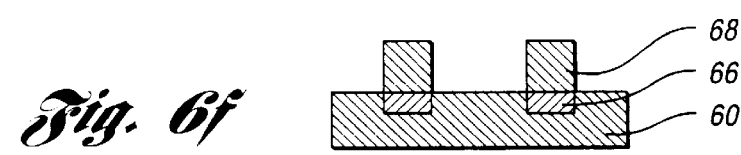
Figure 6G:
Figure 6H:
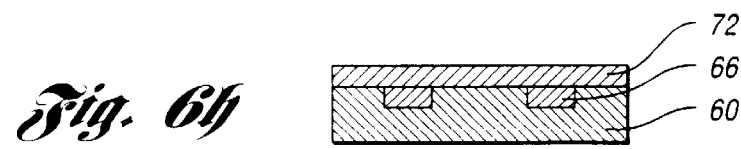
Figure 6I:
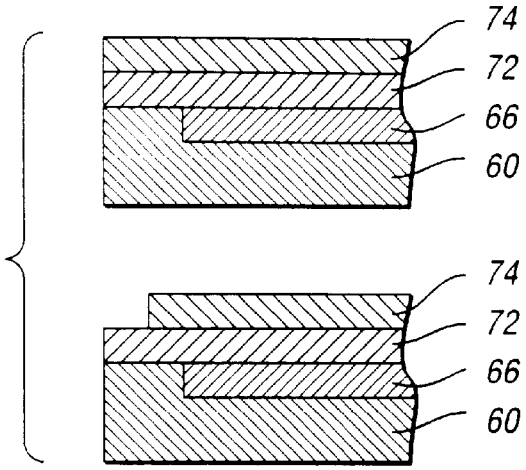
Figure 6J:
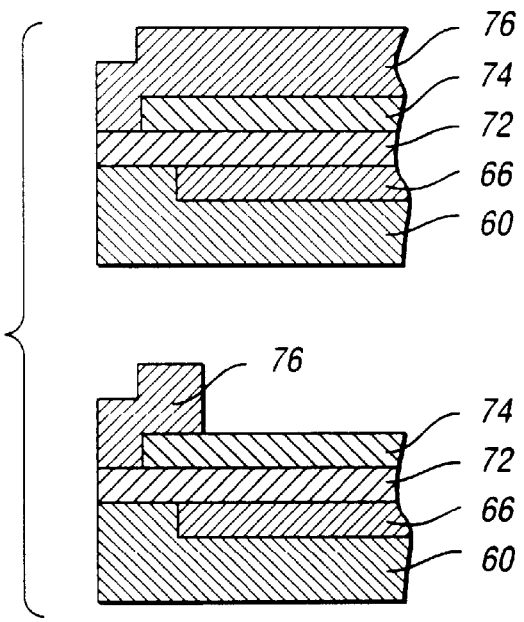
Figure 6K:
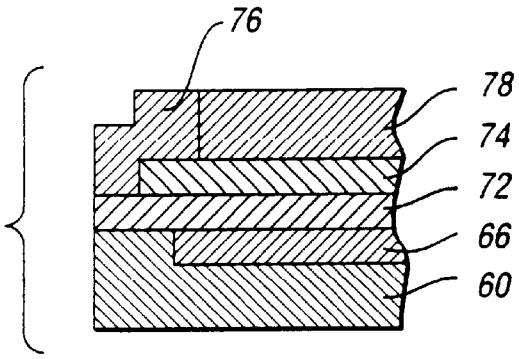
Figure 6L:
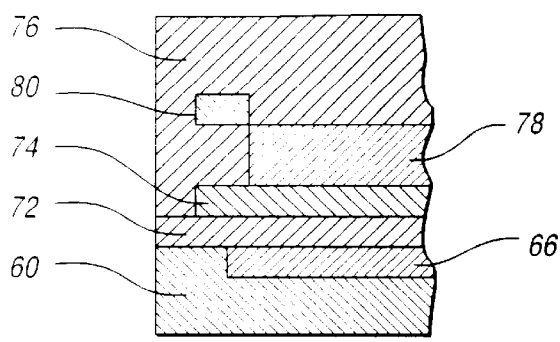
Figure 6M:
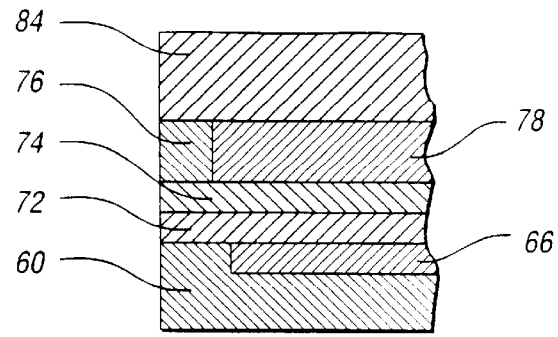
Figure 6N:
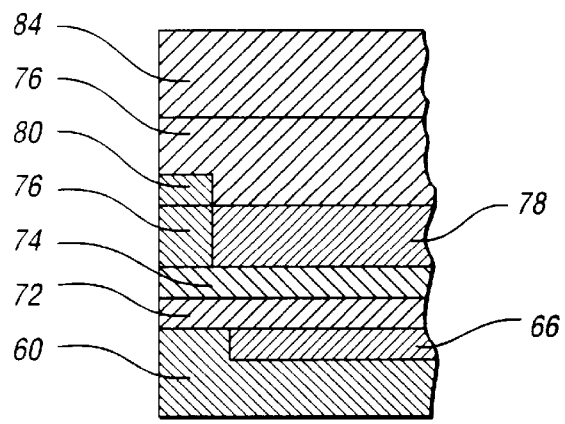
Figure 6O:
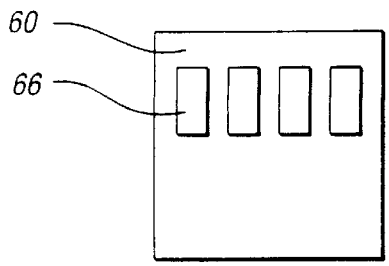
Figure 6P:
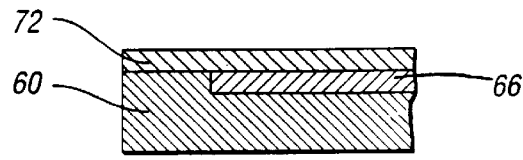

Referring finally to FIGS. 6a–p, a heat exchangeable thin film recording element of the present invention is shown sequentially during its manufacture according to the method of the present invention. As seen in FIG. 6a, a substrate (60) is coated with a photo-resist (62). For an unshielded recording element, substrate (60) may be ferrite. For a shielded recording element, substrate (60) may be a non-magnetic ceramic material coated with an insulating layer, such as aluminum oxide, and a magnetic pole layer.

As seen in FIG. 6b, photo-resist (62) is exposed to ultraviolet light through a mask (64) and developed to remove portions thereof. As seen in FIG. 6c, the resultant exposed portions of substrate (60) are trenched, such as by ion milling. The remaining portions of photo-resist (62) are then removed.

Next, as seen in FIG. 6d, substrate (62) is coated with a thermally conductive carbon layer (66) having a thickness equal to the depth of the trenches previously cut in substrate (60). As seen in FIG. 6e, the carbon layer (66) is covered with a photo-resist (68), exposed to ultraviolet light through a mask (70), and developed to remove portions thereof. Thereafter, as seen in FIG. 6f, those portions of the carbon layer (66) left exposed by the photo-resist process are removed using a dry etching technique, such as reactive ion etching. The remaining portions of photo-resist (68) are then removed.

FIGS. 6g and 6o shows a cross-sectional and a top view, respectively, of substrate (60) prepared with carbon layers (66) trenched therein. FIGS. 6h and 6p show two cross-sectional views, respectively, of substrate (60) and carbon layers (66) trenched therein with an insulating layer of aluminum nitride (72) deposited thereover.

It should be noted here that the process discussed thus far in conjunction with FIGS. 6a–h describes the method of the present invention for manufacturing a heat exchangeable thin film recording element for use in high density recording heads. The remaining steps described hereafter are part of a conventional process for fabricating MR read tracks.

In that regard, as seen in FIG. 6i, an MR layer (74) is deposited on aluminum nitride insulative layer (72), and then patterned by a photo-lithographic process to remove a portion thereof. Thereafter, as seen in FIG. 6j, an insulative layer (76), such as aluminum oxide, is deposited over MR layer (74), and also patterned by a photo-lithographic process to remove a portion thereof.

Next, as seen in FIG. 6k, a conductive layer (78), such as gold, is deposited on MR layer (74). Conductive layer (78) may also be patterned by a photo-lithographic process so that portions thereof may be lifted off to form conductive leads. It should be noted that FIG. 6k depicts an unshielded recording element.

For a shielded recording element, as seen in FIG. 6l, a magnetic top pole layer (80) is deposited, and then patterned using a photo-lithographic process to remove a portion thereof. Next, an overcoat insulating layer (76), such as aluminum oxide, is deposited and lapped back to form a flat surface.

The substrate is then trimmed to form a head module. A ferrite closure or non-magnetic ceramic closure (84) is then bonded to the head module for the unshielded and shielded recording elements, respectively. FIGS. 6m and 6n show unshielded and shielded recording elements, respectively, after the edges (82) thereof have been mechanically ground and lapped back, to prepare the element-tape interface.

As is readily apparent from the foregoing description, then, the present invention provides an improved thin film recording element for use in high density recoding heads, and a method for manufacturing such an element. More specifically, the thin film recording element of the present invention provides a heat exchange structure to minimize heat induced malfunctions of the recording element which may arise from increased heat generation in such high density recording heads. The heat exchange structure of the recording element also allows for thin film manufacture thereof according to the method of the present invention.

It should be noted, however, that the present invention is not limited to read elements or to use in tape storage systems. In that regard, the heat exchangeable thin film recording element and method for manufacturing such an element of the present invention are also suitable for use in write elements and disk storage systems where increased heat exchange from the recording element is either required or desired.

It is to be understood, then, that the present invention has been described in a illustrative manner and that the terminology which has been used is intended to be in the nature of words of description rather than of limitation. As previously stated, many modification and variations of the present invention are possible in light of the above teachings. Therefore, it is also to be understood that, within the scope of the following claims, the present invention may be practiced otherwise than as specifically described.

What is claimed is:

1. A recording element in a high density thin film recording head, the recording element comprising:
   a substrate;
   a thermally conductive material in contact with the substrate;
   an insulative layer in contact with the thermally conductive material; and
   a magneto-resistive element in contact with the insulative layer such that at least a portion of the magneto-resistive element does not overlay the thermally conductive material, wherein the thermally conductive material and the insulative layer have thermal conductivities sufficient to dissipate heat from the magneto-resistive element so that heat induced malfunctions of the recording element are minimized;
   wherein the substrate defines a trench and the thermally conductive material is located in the trench.

2. The recording element of claim 1 wherein the insulative layer comprises aluminum nitride.

3. The recording element of claim 1 wherein the thermally conductive material comprises diamond-like carbon.

4. The recording element of claim 1 wherein the thermally conductive material comprises graphite-like carbon.

5. The recording element of claim 1 wherein the thermal conductivity of the insulative layer is approximately 2 to 3 W/cm-s-°K.

6. The recording element of claim 1 wherein the thermal conductivity of the thermally conductive material is approximately 3 to 5 W/cm-s-°K.

7. A method for manufacturing a recording element in a high density thin film recording head, the method comprising:
   forming a trench in a substrate;
   depositing a thermally conductive material in the trench in the substrate;
   depositing an insulative layer in contact with the thermally conductive material; and
   depositing a magneto-resistive element in contact with the insulative layer such that at least a portion of the magneto-resistive element does not overlay the thermally conductive material, wherein the thermally conductive material and the insulative layer have thermal conductivities sufficient to dissipate heat from the magneto-resistive element so that heat induced malfunctions of the recording element are minimized.

8. The method of claim 7 wherein the insulative layer comprises aluminum nitride.

9. The method of claim 7 wherein the thermally conductive material comprises diamond-like carbon.

10. The method of claim 7 wherein the thermally conductive material comprises graphite-like carbon.

11. The method of claim 7 wherein the thermal conductivity of the insulative layer is approximately 2 to 3 W/cm-s-°K.

12. The method of claim 7 wherein the thermal conductivity of the thermally conductive material is approximately 3 to 5 W/cm-s-°K.

13. The recording element for use in a thin film high density recording head produced according to the method of claim 7.

* * * * *